Feb. 28, 1928.
F. J. ROUTLEDGE
1,660,456
STARTING SWITCH AND CONTROL PEDAL FOR MOTOR VEHICLES
Filed Feb. 29, 1924    2 Sheets-Sheet 1
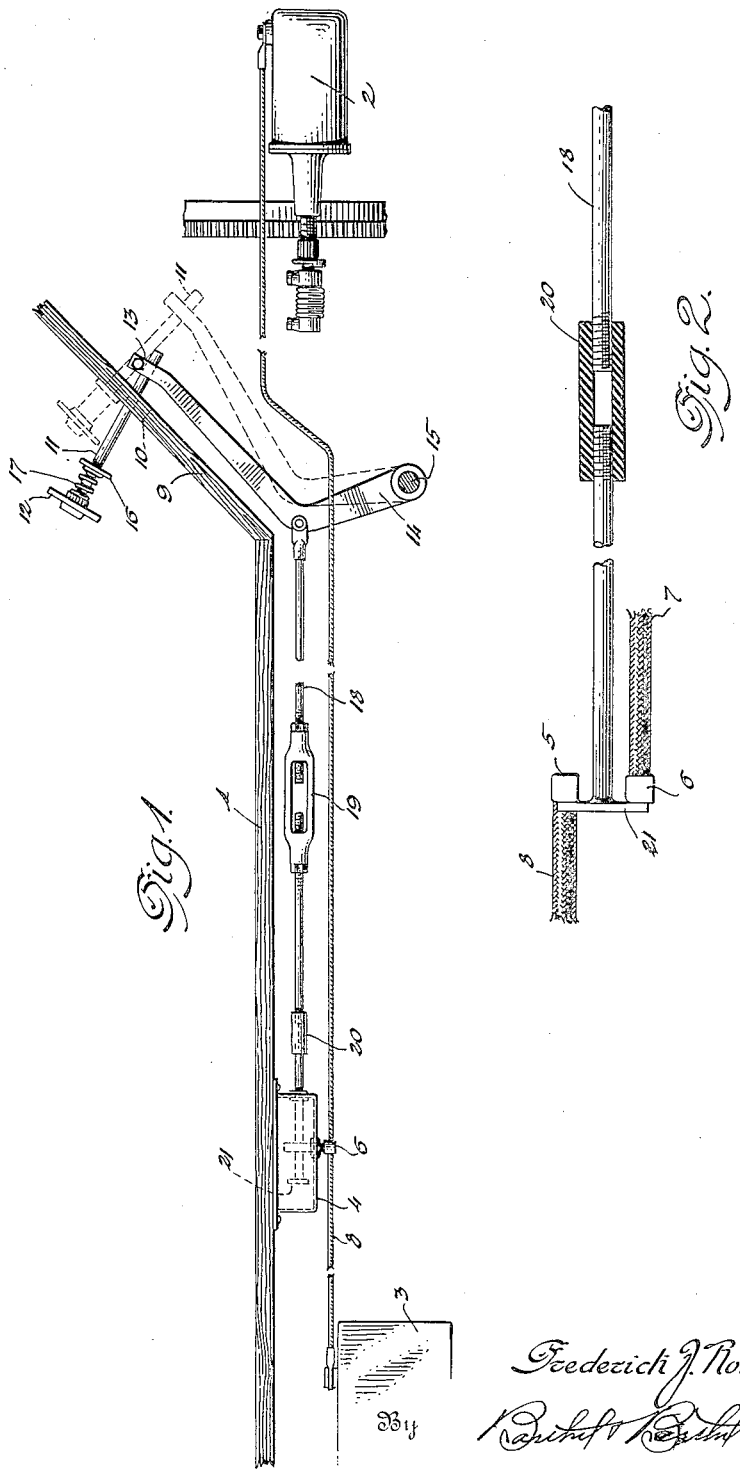
Inventor:
Frederick J. Routledge
By
Attorneys Feb. 28, 1928. 1,660,456
F. J. ROUTLEDGE
STARTING SWITCH AND CONTROL PEDAL FOR MOTOR VEHICLES
Filed Feb. 29, 1924 2 Sheets-Sheet 2
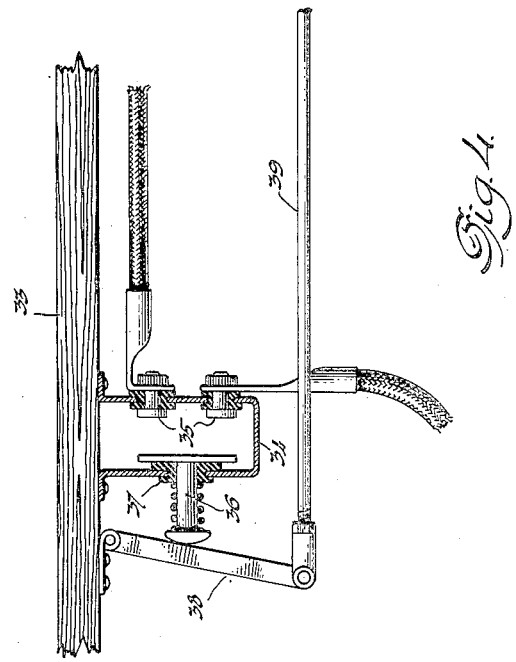
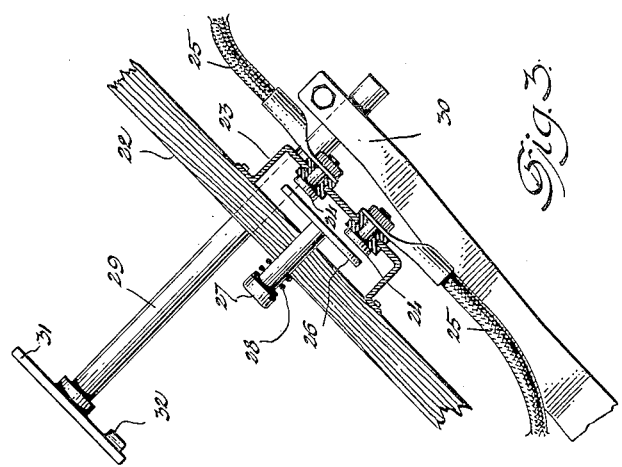
Inventor:
Frederich J. Routledge
By
Attorneys Patented Feb. 28, 1928.

1,660,456

UNITED STATES PATENT OFFICE.

FREDERICK J. ROUTLEDGE, OF MONROE, MICHIGAN.

STARTING SWITCH AND CONTROL PEDAL FOR MOTOR VEHICLES.

Application filed February 29, 1924. Serial No. 695,986.

This invention relates to a starting switch and control pedals for motor vehicles, and the primary object of my invention is to combine a starting switch and clutch pedal in such a manner that initial operation of the clutch pedal causes a clutch to be thrown out and further operation of the pedal causes the starting switch to be closed, thus permitting of a clutch being released in advance of starting the motor of an automobile or other motor vehicle provided with an electrically operated starting device.

Another object of this invention is to provide a novel normally open switch and mechanical means for closing the switch by foot pressure, said mechanical means being insulated relative to said electrical switch so that the same may be safely used.

A further object of this invention is to provide a simple, durable and inexpensive starting accessory for automobiles that may be easily and quickly installed and used without any danger of a motor being started while the clutch is "in", this preventing an automobile from being suddenly started.

The above and other objects are attained by a constructive arrangement of parts that will be hereinafter specifically described and then claimed, and reference will now be had to the drawing, wherein Figure 1 is a side elevation of a pedal control switch in accordance with this invention;

Fig. 2 is a plan of a portion of the switch;

Fig. 3 is a longitudinal sectional view of another form of starter switch, and

Fig. 4 is a similar view of still another form of starter switch.

In the drawings, the reference numeral 1 denotes a floor or support adapted to form part of an automobile having a starter motor 2 and a source of electrical energy, as batteries 3.

Mounted under the floor 1 is a switch casing 4 and extending upwardly through the bottom of said switch casing are contact members 5 and 6 with the contact member 6 connected by a conductor 7 to the motor 2 and the contact member 5 connected by a conductor 8 to the battery 3. When the contact members 5 and 6 are electrically connected, as will hereinafter appear, the stored electrical energy of the battery 3 is adapted to operate the motor 2, and start an automobile engine or power plant (not shown).

Adjoining the floor or support 1 is a footboard or slotted plate 9 and extending through a slide 10 of said footboard is a pedal rod 11 which has its upper end provided with a pedal 12 and its lower end connected, as at 13, to a control crank or pedal 14 carried by an operating shaft 15. The elements 11 to 14 inclusive may constitute a clutch pedal or any other control pedal of an automobile. As a clutch pedal it controls the application of power from an automobile engine to a rear axle assembly and in the operation of an automobile it is desirable to prevent transmission of power to the rear axle assembly while the automobile engine is being started. With a conventional form of clutch interposed between the automobile engine and the rear axle assembly the clutch pedal can be thrown out and the motor 2 safely used for engine starting purposes. To throw the clutch out the pedal 12 is depressed to the dash line position shown in Fig. 1 and under the pedal 12 is a spring supported abutment 16 adapted to contact with the footboard 9 and indicate to the operator of the pedal 12 that the crank 14 has been sufficiently operated for throwing out the clutch. Further pressure upon the pedal 12 compresses the coiled spring 17 supporting the abutment 16 relative to the pedal 12, and it is this secondary or further actuation of the crank 14 which I utilize for closing the starter switch.

Connected to the crank 14 is a reach rod 18 provided with a conventional form of turn-buckle 19 for increasing or decreasing the longitudinal dimension of the reach rod, said turn buckle permitting of adjustment whereby the starter switch will be properly actuated by the crank 14. The reach rod 18 is preferably made in two sections connected by an insulation coupling 20 and the rearmost section of said reach rod extends into the switch casing 4 and is provided with a contact head or bridge member 21 adapted to engage the contact members 5 and 6 and establish an electrical connection between the battery 3 and the starter motor 2. The switch can be retained closed as long as pressure is maintained on the pedal 12, and when the pedal 12 is released the expansive force of the spring 17 imparts impetus to the pedal rod 11 to cause the crank 14 to be raised and the switch opened. This action is further brought about by the usual springs associated with a clutch, the crank 14 or intervening connections.

Reference will now be had to Fig. 3, showing the lower face of a foot board 22 provided with a switch casing 23 and mounted in said switch casing and insulated therefrom from contact members 24 which also serve as binding posts for conductors 25 adapted to establish an operating circuit for a starter motor. The contact members 24 are adapted to be connected by a bridge member 26 carried by a plunger 27 slidable in the foot board 22. Encircling the plunger 27 is a coiled expansion spring 28 which holds the plunger 27 normally elevated and the switch open. The switch and plunger are located adjacent a pedal rod 29 extending through the foot board 22 and connected to a clutch crank or control lever 30. The rod 29 has a pedal 31 provided with an insulated contact piece 32 which is adapted to engage and depress the plunger 27 when the pedal 31 is depressed.

Another arrangement is shown in Fig. 4 where a floor board 33 has a switch casing 34 provided with contact members 35 similar to the contact members 24, and there is a plunger 36 somewhat similar to the plunger 27, with the exception that the plunger 36 is insulated from the switch casing 34, as at 37. The plunger 36 is normally engaged by a pivoted hanger 38 supported from the lower face of the floor board 33 and the hanger 38 is pivotally connected to a reach rod 39, which may be similar to the forward section of the reach rod 18. The reach rod 39 is adapted to be connected to a clutch or control pedal similar to that shown in Fig. 1 so that actuation of the clutch or control pedal will cause the plunger 36 to connect the contact members 35 and establish an operative circuit for a starter motor.

From the foregoing it will be observed that my invention broadly involves the location of an electric switch so that it may be ultimately closed by a clutch or control pedal, the arrangement being such that there must be an initial actuation of the clutch or control pedal before the electric switch is closed.

While in the drawings there are illustrated the preferred embodiment of my invention, it is to be understood that the structural elements are susceptible to such variations and modifications as fall within the scope of the appended claim.

What I claim is:—

The combination with an automobile having a floor, a footboard, a source of electrical energy, and a starter motor adapted for an operative circuit including said source of electrical energy, of a normally open switch in said circuit, said switch being attached to said floor, an angular clutch pedal extending through said footboard, a sectional adjustable reach rod connected to the angular portion of said clutch pedal and extending under and parallel to said floor and adapted to be actuated by said clutch pedal to cause closing of said switch and operation of said starter motor, and a spring supported abutment on said clutch pedal under the treadle portion thereof adapted for engagement with said footboard to indicate closing of said switch.

In testimony whereof I affix my signature.

FREDERICK J. ROUTLEDGE.